Dec. 17, 1940. E. V. BLOOMQUIST 2,224,948
MEAT AND BONE GRINDING MACHINE
Filed Aug. 10, 1939
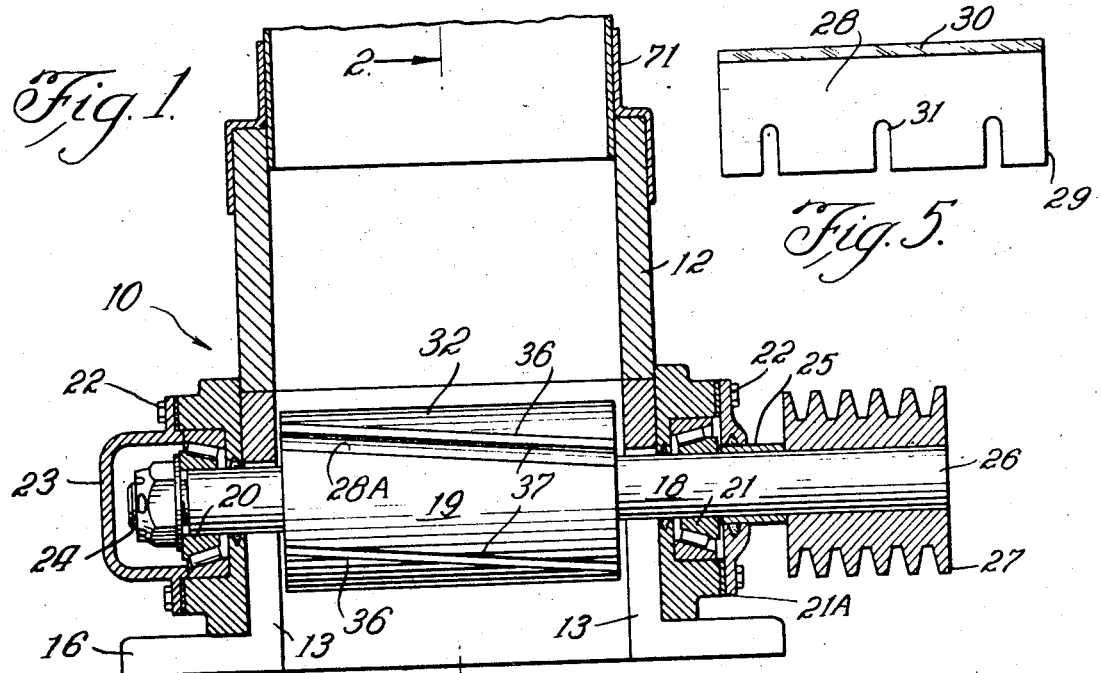
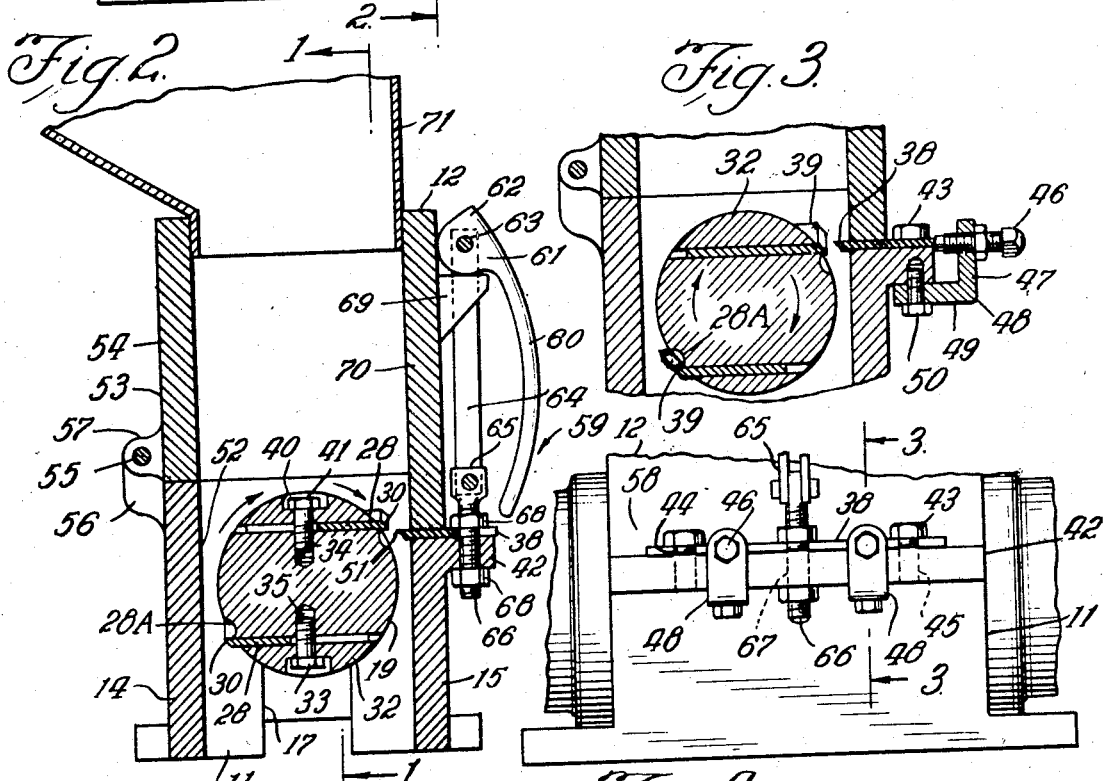
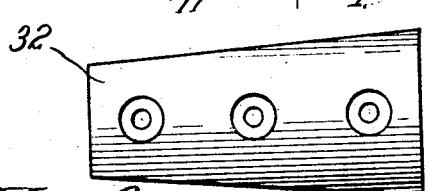
Inventor:
Evert V. Bloomquist
By: R. L. Lowell
Atty.

Patented Dec. 17, 1940

2,224,948

UNITED STATES PATENT OFFICE 2,224,948

MEAT AND BONE GRINDING MACHINE

Evert V. Bloomquist, Wausau, Wis.

Application August 10, 1939, Serial No. 289,353

2 Claims. (Cl. 83—6)

This invention relates to a meat and bone grinding machine of heavy duty type adapted to grind large portions of an animal carcass and is particularly applicable for use on fox farms and the like.

The grinders previously used operated to crush the meat and bone rather than to grind them so that the resultant grindings were a mixture of large bone portions and crushed meat which were unsatisfactory for animal feeding purposes. Further, these grinders were bulky and required large flywheels and motors for their successful operation. The heavy weight and high power were necessitated because of the crushing or breaking action of the grinder on the portions fed thereto and their almost immediate ejection from the grinder in crushed form. Since each crushing action served to brake the grinding mechanism, sufficient time had to elapse to permit the machinery to come up to speed. A continuous feeding of the grinder therefore was not obtainable. In meat grinding machines of this type, it was necessary generally to provide a manually operated pusher in the feeding hopper for forcing the meat and bone into the cutting mechanism. This resulted in inconvenience to the operators, and a considerable length of time for the meat grinding operation. It is an object therefore of the present invention to provide for a novel arrangement of the cutting knives of the grinding mechanism whereby to obtain an automatic uniform feeding of the meat portions therefrom the feeding hopper into the grinder whereby to eliminate the requirement for a pushing device of any kind. Since the grinder is of comparatively high speed design it also provides for a grinding capacity which exceeds that of the previously used large grinding machines.

It is a further object of this invention to provide a grinding mechanism which efficiently and completely grinds into small particles all portions of meat and bone which are fed thereto.

Another object of this invention is found in the provision of an eccentric lever which serves to hold the pivotally connected housing members of the grinding mechanism in assembled operative position, and provides ready access to the grinding knives for cleaning and servicing purposes upon a release thereof; the housing members swinging apart from each other.

Other objects and advantages of the present invention will become apparent from the accompanying description and drawings wherein:

Fig. 1 is a sectional elevation of the grinder as viewed along line 1—1 of Fig. 2; Fig. 2 is a section viewed along line 2—2 of Fig. 1 showing the arrangement of the head and bed knives, and the assembly of the eccentric connecting means, Fig. 3 is a section taken along line 3—3 of Fig. 4, showing the bed knife adjusting means; Fig. 4 is a fragmentary side elevational view showing the assembly of the bed knife, Fig. 5 is a plan view of a head knife and Fig. 6 is a plan view of a detachable segment for holding a head knife in the head member.

With reference to Figure 1 the grinder frame housing 10 is seen to consist of a base structure 11, and a hopper member 12. The base 11, is substantially rectangular in shape, open at the top and bottom, and is formed with end walls 13 and side walls 14 and 15. The walls 13 adjacent their lower ends are provided with pedestals 16, for securement of the grinder to a suitable stand or table (not shown). The walls 13 are further provided with slotted portions 17, adapted to receive therein, the shaft 18 of a head member 19, which will be hereinafter fully described. The shaft is journaled in suitable bearings 20 and 21 which are secured as by screws 22 or the like to the end walls 13. A bearing cap 23 is fitted over the shaft end 24, to prevent dirt and dust from entering the bearing 20. The bearing 21 is provided with a plate 21A, which is positioned about a sleeve 25 mounted on the shaft extension 26, which has secured thereto in a suitable manner a pulley 27. The pulley 27 is adapted for belt engagement with a driving motor or the like (not shown) and may be of any suitable type.

The head 19 is integrally formed with the shaft 18 and is of a size to fit closely within the base 11. It is thus seen that the head 19 and shaft 18 may be positioned as a unit in the base member by placement in the slots 17; the bearings 20 and 21 serving to maintain the head in assembled operative position therein. The head 19 includes two knives 28 (Figs. 4 and 5) which are of, the flat straight type and are provided on the side 29, opposite the cutting edge 30, with slots 31 for adjustment and assembly purposes. In assembly the knives 28 are held in proper position in the head 19 by similar segmental head portions 32 and cap screws 33 which extend through apertures 34 in the portions 32, and through the slots 31 into tapped holes 35 in the head 19 for threaded engagement therewith. The portions 32 (Figs. 1 and 6) consist of similar axially extending segments which are removed from diametrically opposite sections of the head at an angle, to the axis of the head, of between three and twenty degrees. It is to be noted that the flat sides 36 of the segments and the mating flat sides 37 of the head lie in parallel planes. Since the knives 28 are arranged between the segments 32 and the sides 37 of the head 19, it is seen that they too are positioned in diametric opposition, parallel to each other and hence similarly inclined to the axis of the head. The limits of angular inclination, as above defined, of the knives 28 with respect to the axis of head, provided for a highly efficient and desired shearing action when operating in conjunction with a longitudinally disposed stationary bed knife 38, in a manner to be later fully explained. The cutting edges 30 of the knives 28 are also diametrically positioned so that the leading ends 39 thereof are located at opposite ends of the head 19 (Figs. 2 and 3). It is thus seen that the knife blades 28 are arranged in an opposed angular relation so that each blade 28 will start its cutting action with the blade 38 at an opposite end of the head member 19. By positioning the cutting edges 30 of the blades 28 in this manner the start of the cutting action of each blade 28 is made to occur at opposite ends of the head 19, for a purpose to be later described. The knives 28 are readily adjusted in the head 19 by means of the slots 31, which permit a transverse movement of the knives between the head and the portions 32. The desired adjustment is maintained by the tightening of the screws 33. The counter sunk portions 40 in the portions 32 serve to keep the cap screw heads 41 within the peripheral boundary of the head and out of contact with the material to be ground. It is thus seen that a maximum bearing support for the cutters 28, is obtained by the above described assembly, whereby adjustment and replacement of the cutters, due to heavy cutting, is reduced to a minimum.

The knives 28 operate in conjunction with the bed knife 38 which is substantially similar to the knives 28. The bed knife 38 (Figs. 3 and 4) is supported on a projection 42 which extends laterally of the base 11, and is secured thereto by means of cap screws 43, which extend through the knife slots 44 into tapped holes 45 for threaded engagement in the projection 42. Adjustment of the bed knife 38 relative to the head knives 28 is obtained by similar adjusting screws 46, each of which is positioned in the leg 47 of an L-member 48, the leg 49 thereof being secured to the underside of projection 42 by a cap screw 50.

In the efficient operation of the present grinder, it is of the utmost importance that the bed knife be positioned a distance of between one-sixth and one-third the diameter of the head 19 above the axis of the head, the knives 28 and bed knife 38 being adjusted for cutting action at that position. In experimental work it was found that this position of the bed knife in conjunction with the three to twenty degree angular inclination of the head knives, with respect to the head axis, as above defined, provides for an automatic feeding of the material from the hopper 12 into the cutting zone of the knives. The automatic feeding of the meat into the grinding mechanism is obtained as a result of an effective cutting action over a considerable section of the cutting edge 30 of each knife, which section includes the leading end 39 of the knife, while the remainder of the cutting edge serves to draw the meat downwardly into the grinder. Since the knives are arranged with their leading cutting ends at opposite ends of the head 19, that portion of each knife which draws the meat into the grinding mechanism serves as a feeding means for the effective cutting length of the other knife. The combined cutting and feeding action from a single knife is due to the use of knives 28 of a flat rather than a helical form, the varying distance of the knife increments along the cutting edge 30 from the axis of the head, resulting in correspondingly varying circles of travel and hence varying clearances between such increments and the cutting edge 51 of the bed knife 38. A cutting operation is thus maintained at all times so that a continuous feed of material into the grinder may be maintained. The grooves 28A, formed in the head 19 adjacent the underside of the knives 28 and coextensive therewith serve to trough the meat and bone being cut, whereby to eliminate a collecting of the cut material about the underside of the knives. A setting of the bed knife 38 below the above defined position results in a low grinding capacity of the grinder due to the material being pushed above the knives rather than drawn into the knives, thereby requiring a manual pusher for forcing the material into the knives. The present invention eliminates the need for a manual pusher for the reasons above explained. When the leading ends of the knives 28 are disposed at the same end of the head 19 the meat to be ground tends to feed toward that one end of the head, thereby lessening the grinding capacity of the grinder. By arranging the leading ends 39 of the cutting edges 30 of the knives 28 at opposite ends of the head, the meat is fed substantially uniformly over the length of the head, thereby providing for a feeding rate commensurate with the maximum cutting speed of the knives. A high grinding capacity of the grinder is thus obtained.

The base 11 adjacent the upper end 52 of side wall 14 and the hopper 12 adjacent the lower end 53 of side wall 54 are pivotally connected by means of a pin 55 which is journalled in laterally projecting ears 56 and 57, which are formed on the walls 14 and 54, respectively, of the base 11 and hopper 12, respectively. The hopper 12 may thus be readily swung away from the base member 11 to provide a complete and ready access to the head 19 and knives 28 for cleaning and servicing purposes. It is to be noted that the knife 38 is positioned on the top of the base 11, the adjacent portion 58, of the hopper 12 being suitably formed to seat thereon. The lifting of the hopper 12 from the base 11, therefore, also provides for complete accessibility to the knife 38. The material fed to a grinder of this type generally consists of quartered portions of horses, cattle and the like, which portions contain fats and muscular tissues. During use of the grinder this material becomes lodged about the cutting head and it is desirable therefore, that the head 19 and the knives 28 and 38 be frequently cleaned.

The members 11 and 12 are secured together in operative assembly position by means of an eccentric lever mechanism, which is denoted generally as 59. The mechanism 59 includes a lever 60, having an eccentric 61 near the end 62 thereof, which is pivotally connected to the end 63 of a double link 64. The link end 65 is pivotally connected to the end of bolt 66 which is fitted through a slot 44 in the bed knife 38 and an aperture 67 in the projection 42. Lock nuts 68 serve to secure the bolt 66 in the projection 42 and also to hold the bed knife 38 in position thereon. The nuts 68 serve further to provide for an adjustment of the effective operating length of the link 64, whereby to obtain a suitably tight engagement between the eccentric 61 and the lateral projection 69 on the side wall 70 of the hopper 12. It is apparent, therefore, that an upward movement of the lever 60, as viewed in Fig. 2, will effect a disengagement of the eccentric 61 and projection 69 so as to permit the hopper 12 to be swung away from the base 11. The repositioning of the hopper 12 on the base 11 is obtained in an obvious manner, the lower end of hopper 12 and the upper end of base 11 being adapted for a mating engagement.

In the operation of the present invention the head is rotated in the direction of the arrows (Fig. 2) by engagement of the pulley 27 with a suitable driving means (not shown). The meat and bone fed into the hopper 12 is automatically drawn into the cutting zone of the knives 28 and 38, in the manner above described. The ground meat and bone is discharged from the grinder through the bottom of the base member 11. To facilitate feeding into the hopper 12 and to prevent any ground meat and bone particles from being thrown upward therethrough a hopper extension 71 may be used, which fits on the hopper 12, as illustrated in Figs. 1 and 2.

The present invention is thus seen to provide for an automatic feeding meat grinder which is simple of construction, efficient in operation, compact of design, and cheap in cost.

It is to be understood that a preferred embodiment only of the present invention has been described and shown herein, and that alterations and modifications in the parts and arrangement thereof, may be effected without departing from the spirit and full intended scope of the invention, as defined by the claims appended hereto.

I claim:

1. In a meat and bone grinding machine, having a frame member, the combination of a cylindrical head member rotatably positioned within said frame member, a pair of cutting blades of flat type arranged in a substantially parallel relation in said head member at an angle to the axis of said head member, and a longitudinally extending stationary knife in operative association with said blades at a position above the axis of said head member, the cutting edge of each of said blades projecting substantially evenly from the periphery of said head member over the length thereof, each blade co-acting with the stationary knife to effect a cutting of the meat and bone over the leading blade portion and to draw the meat and bone in the direction of rotation of said head over the remaining blade portion.

2. In a grinding machine having a frame structure, the combination of a head member rotatably positioned within said structure, a pair of cutting blades arranged in a substantially parallel relation in said head, and a longitudinally extending stationary knife in operative association with said cutting blades, said cutting blades being reversely inclined relative to said stationary cutting knife at the zone of cutting engagement.

EVERT V. BLOOMQUIST.